United States Patent Office 3,307,033
Patented Feb. 28, 1967

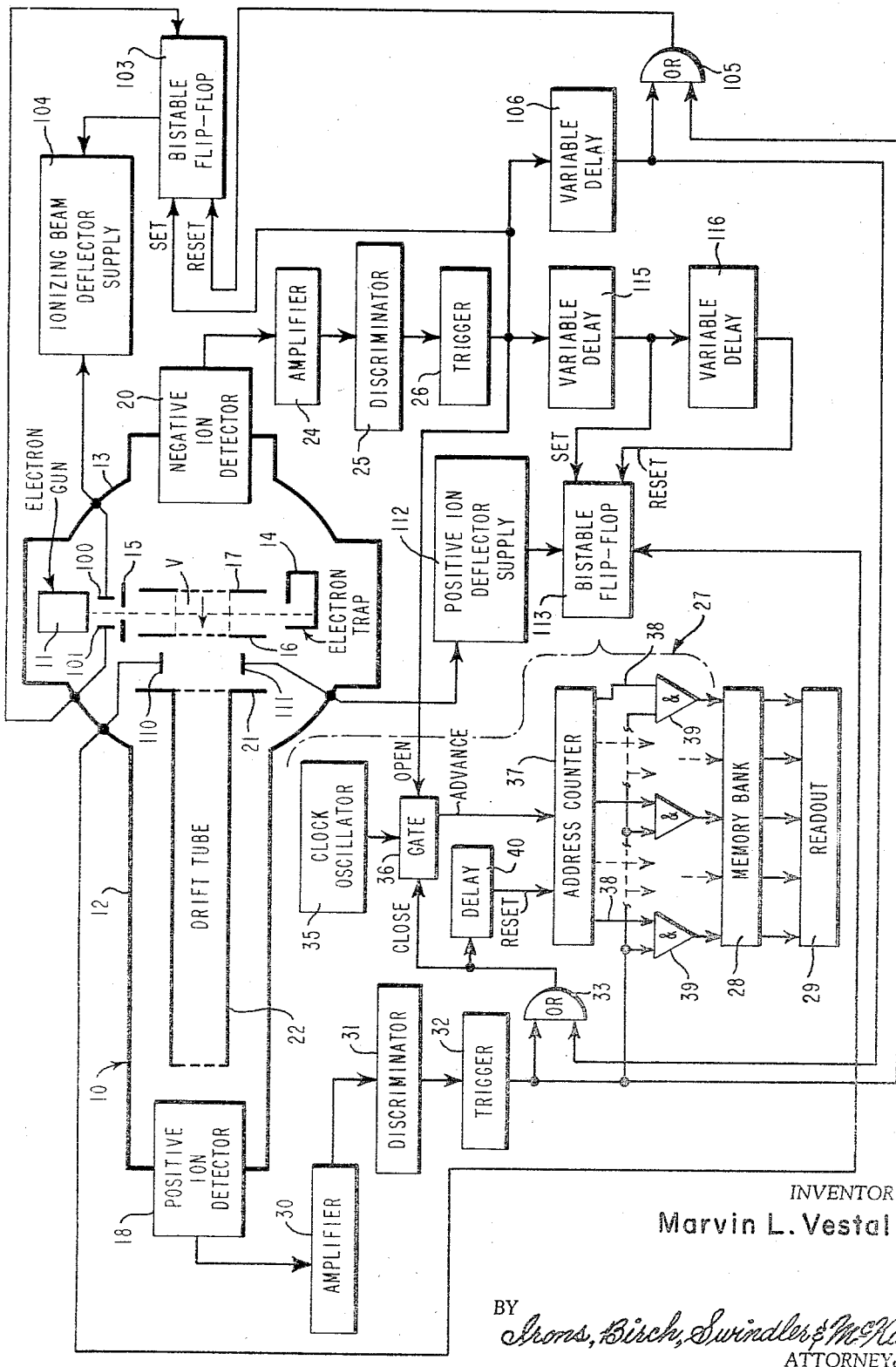

3,307,033
COINCIDENCE MASS SPECTROMETER WITH ELECTROSTATIC MEANS TO SEPARATE POSITIVE AND NEGATIVE IONS AND DETECTORS AND METHOD OF USE
Marvin L. Vestal, Baltimore, Md., assignor to William H. Johnston Laboratories, Inc., Baltimore, Md., a corporation of Maryland
Filed July 19, 1963, Ser. No. 296,236
26 Claims. (Cl. 250—41.9)

This invention relates to investigation of ionization phenomena, and more particularly to improved method and apparatus especially designed for coincidence mass spectroscopy.

The present invention represents an improvement over the method and apparatus of Rosenstock Patent No. 2,999,157, issued September 5, 1961. The Rosenstock patent relates to what is termed coincidence mass spectroscopy, which differs from ordinary time-of-flight mass spectroscopy principally in that both the positive and the negative ions from ionization events are detected and then correlated. The difference in transit times to their respective detectors of the positive and negative ions from each ionization event can then be used to furnish an indication of the differences in the masses of the ions formed from the ionized molecule. If the negative ions detected are secondary electrons, the difference in transit time is a measure of the mass of the positive ion detected.

In the apparatus specifically disclosed in the Rosenstock patent as illustrative of apparatus usable to measure the difference in times-of-flight, the negative ions or secondary electrons are subjected to variable delays after detection to furnish delayed pulses to a coincidence circuit to which the output of the positive ion detector is also directed. Then, when the pulses from the positive ion detector and the delayed negative ion pulses are time-coincident, an indication of the formation of an ion corresponding to that time delay is obtained.

It is indicated in the Rosenstock patent that the delays can be obtained by separate delay lines of different time characteristics corresponding to different masses. Another way in which the delay and coincidence effect can be obtained is through initiation of a measuring time interval upon detection of the negative ion or secondary electron, and termination of this time interval upon detection of the corresponding positive ion. The negative ion is thus, in effect, delayed in the timing device and after such delay, is coincident with the positive ion pulse at the time the period is terminated.

With this technique of measurement, it is possible to sweep over an entire range of times-of-flight, yet it is not necessary to provide a series of separate delay lines of delays corresponding to each of the various masses which may be present in the sample of interest. This is particularly useful when the various isotopes of an element are being examined, for instance, as well as when the presence of a trace element in another substance is being determined. It is even more advantageous when the fragmentation pattern of a complex molecule is being examined.

The method and apparatus of the present invention is designed to improve the relatively sensitivity (as distinguished from the absolute sensitivity, which is extremely high) in the coincidence mass spectrometer described in the Rosenstock patent. This improvement is particularly desirable when it is necessary to determine the presence and relative abundance of a trace element in a sample containing masses which are very much more abundant than the trace. As an illustration of the merits of the present invention, assume that it is desired to detect one part per million of carbon monoxide (CO—mass 28) in oxygen ($O_2$—mass 32). A signal of one ion would not be significant so that it might be desired to count at least ten to twenty carbon monoxide ions. This would require counting ten to twenty million oxygen ions. At a counting rate of 1,000 ions per second, this measurement would require 2.5 to 5 hours. If that amount of time were not available and measurement was required in 15 minutes to half an hour, the counting rate would have to be increased to at least 10,000 ions per second.

With the coincidence mass spectrometer as constructed prior to the present invention, since the noise level increased with counting rate, ten or twenty ions of a trace tended to be blacked-out or covered-up by the noise at such a high counting rate.

In contrast, with the present invention, counting rates of $10^5$ ions per second are readily achieved without such a blackout effect. In fact, not only can the time of measurement be greatly decreased, but also the significance of a given number of trace material signals or counts is increased by reason of tremendous reduction in the amount of noise detected.

The object of the present invention therefore is to increase the relative sensitivity of the coincidence mass spectroscopy method and apparatus. More particularly, a further object is to improve the ability of the coincidence mass spectrometer to respond to trace elements present in very small relative proportions, and to permit reliable detection of such elements in relatively short periods of time.

The invention generally comprises the realization of the causes of a major number of the noise pulses incident to operation of the coincidence mass spectrometer and the substantial elimination of such noise pulses through use of at least one of two different techniques. The first technique is the inhibition of the ionization beam from ionizing molecules in the region or volume from which ions are detected, during the period initiated by detection of a negative ion and terminated by detection of the corresponding positive ion. This technique results in elimination of noise due to ionization events occurring after the event which produced the negative ion that was detected.

The second technique employed by the present invention is the inhibition of positive ions from reaching the ion detector except for a short time interval following the detection of a negative ion. The result of employment of this technique is that ions which are formed before the ionization event which yielded the negative ion which was detected cannot reach the ion detector and result in noise pulses.

The combination of the two techniques referred to above results in a tremendous decrease in the counting rate-dependent noise which the coincidence mass spectrometer detects, and makes it possible to employ much higher counting rates and therefore to reach an appropriate confidence level of indication of presence and relative abundance of small traces, in a very short period of time. Further, the noise reduction makes it possible to detect very minute traces which might otherwise be totally obscured by noise.

The invention will now be more fully described in conjunction with a preferred embodiment of apparatus thereof as shown in the accompanying schematic drawing.

The apparatus of the invention is of course designed for employment with a coincidence mass spectrometer which may be of the type generally indicated at 10. That spectrometer, in conformance with the Rosenstock teaching, employs an ionizing source such as the electron gun 11. It will be understood, however, that other ionizing sources, such as alpha sources, photon sources, etc. may also be used.

The electron gun is positioned in a sealed envelope 12 which is preferably evacuated to an extremely low pressure and into which an appropriate sample to be investigated is introduced. The Rosenstock Patent No. 2,999,157 discloses the use of a vacuum pump and an appropriate connection therefrom to the envelope to reduce the pressure therein and the use of a source of a gas sample and an appropriate connection therefrom to the envelope to furnish this sample for investigation. These elements may also be employed with the envelope shown in the drawing of this application, but they are not shown, for simplicity's sake.

As indicated in the Rosenstock patent referred to, it is not essential that the sample be in gaseous form, as long as both positive and negative ions are supplied during ionization thereof.

The ionizing beam from the electron gun 11 is directed across an enlarged portion 13 of the envelope toward an electron trap schematically indicated at 14. This trap is intended to collect the primary electrons and prevent them from reaching the walls of the envelope 12, so that secondary electrons therefrom may be avoided. As an alternative, as indicated in the Rosenstock patent, the number of primary electrons from the electron gun may be detected and counted, for the type of investigations indicated therein.

During its travel from the gun 11 to the trap 14, the ionizing electron beam passes through an appropriate focussing and accelerating system generally indicated by the electron lens 15. As the beam passes across the spectrometer tube, it naturally ionizes gas molecules present in the regions through which it flows. Those ions which are formed in a region or volume indicated at V are those which are to be detected, and an electric field is provided in this volume between a pair of focussing and accelerating grids 16 and 17. That field has the direction indicated by the arrow in the volume V and urges positive ions in the direction of the field toward a positive ion detector 18. On the other hand, secondary electrons released by ionization events in the volume V are urged by the field toward the secondary electron detector 20. The extent of opening of the grids restricts detection of the ions to those which occur within the volume V.

The positive ions may also be subjected to a further electric field between the grid 16 and a grid 21 located at the entrance to a drift tube 22. The two fields may be provided by ion accelerating apparatus of the type disclosed in copending application Serial No. 217,806 filed August 20, 1962, in the names of Wahrhaftig et al., entitled "Ion Accelerating Apparatus" and assigned to the assignee of the present invention. Reference is made to that application for a complete disclosure of a preferred structure of the field-generating apparatus and for an explanation of the use of the various grid and drift tube elements. Suffice it to say herein that positive ions from volume V are accelerated into the drift tube 22 by the two electric fields through which they pass. The ions then drift through a relatively field-free tube to the ion detector 18.

It will be noted that the secondary electron detector is shown as very much nearer the volume V than is the positive ion detector. This is for the reason that the initiation of the time period of interest results from detection of a secondary electron, so that it is desired that a minimum delay occur before such detection. On the other hand, a fairly long travel time of the positive ions is advantageous, to increase the accuracy of measurement of the relative travel time and therefore the accuracy of measurement of the mass of the detected positive ion.

The secondary electron detector, like the positive ion detector, may be any appropriate type of well-known apparatus, including the electron multiplier generally shown in the Rosenstock patent. The detector 20 supplies an electrical pulse for each electron which reaches it, which pulse is amplified to an appropriate level by a suitable pulse amplifier 24. The output of the amplifier 24 is supplied to a suitable discriminator 25 which, like the amplifier, may be of any well-known type appropriate to the function which it is to perform.

The discriminator 25 is designed to discriminate against pulses of lower than a preset but adjustable level, to minimize detection of noise pulses which may have originated in the amplifier or even in the secondary electron detector.

The output of the discriminator 25 is shaped into a triggering pulse by a trigger 26 which may be of the well-known Schmitt type and which delivers a peaked pulse for each input pulse. The trigger output is supplied to an apparatus generally indicated at 27 and which functions as an address scaler to determine to which channel of a memory bank 28 an indicating pulse is directed. More particularly, the address scaler 27 develops a measuring time interval of length responsive to the difference in travel times of the corresponding secondary electron and ion from the volume V to the respective detectors. The length of that interval determines the address in the memory bank to which a pulse is directed by the address scaler and from which the pulse can be keyed out to an appropriate readout mechanism 29 which is more fully described hereinafter.

The address scaler is also controlled by a voltage pulse from the positive ion detector 18. The output of that detector is directed to an amplifier 30 of design similar to that of amplifier 25. The pulse output of amplifier 30 is provided to a discriminator 31 of design and purpose similar to that of discriminator 26. The output of discriminator 31 is a voltage pulse for each positive ion detected by the detector 18 and which is formed into a trigger pulse by a trigger 32 of design and purpose similar to that of trigger 26. The output of trigger 32 is delivered directly and through a buffer OR 33 to the address scaler 27.

The apparatus so far described is merely an embodiment of the Rosenstock patent referred to hereinabove wherein the delay function and the coincidence function indicated in that patent are performed in the address scaler 27. That apparatus may, for instance, include a very high frequency clock oscillator 35 which is triggered or whose output is gated through a gate 36 into an appropriate scaling matrix or address counter 37 by receipt of a pulse from the trigger 26, representing detection of a secondary electron. Pulses from the clock oscillator may then continue to be counted and advanced through the address counter until a pulse from the trigger 32 indicates detection of a positive ion by the detector 18. The number of pulses generated by the oscillator or gated from the oscillator during this time interval will then represent the difference in times of flight of the secondary electron to the detector 20 and the positive ion to the detector 18.

The clock oscillator 35, like the gate 36, may be of any well-known type. The oscillator desirably delivers cyclic pulses of voltage, which are precisely timed, through the gate to the address counter 37. For instance, the oscillator may appropriately be of 100 mcs. frequency, to deliver a voltage pulse to the counter every 10 nanoseconds, after a trigger pulse indicating detection of a secondary electron opens the gate 36.

As indicated in the drawing, each pulse to the address counter 37 from gate 36 advances the counter by one count. That counter may be of suitable well-known design operable to deliver an output voltage to the one of a number of output channels 38 determined by the number of input pulses which have been received as of each instant. As shown in the drawing each output channel of the counter may be connected to a different logical AND or coincidence circuit 39. The output of trigger 32 may then also be supplied to each AND 39, so that an input is supplied to the appropriate channel of memory bank 28 determined by the instantaneous count in counter 37 at the time a positive ion is detected by detector 18.

The pulse output of trigger 32 is also supplied through OR 33 to the CLOSE input of gate 36, so that the counter 37 will not be further advanced after detection of a positive ion. The output of OR 33 is also supplied through a short time delay circuit 40 to the RESET input of the address counter to prepare it for the timing of the next measuring time interval.

The next electron detected by negative ion detector 20 will again open the gate 36 and begin advance of counter 37. If the positive ion paired or corresponding with that electron is of the same mass as that previously detected, the counter will have reached the same count as before, by the time a pulse from trigger 32 closes the gate and keys a pulse into the same channel of memory bank 28. The pulses will then add in the memory bank. If the positive ion is of different mass, a different channel 38 of the address counter will be activated at the time the ion is detected, and a different channel in the memory bank will receive a unit pulse.

At the end of an appropriate measurement time representing a substantial number of detected ionizations, the sum of the pulses stored in each of the channels of the memory bank 28 may be gated out to the readout apparatus 29 by an appropriate mechanism (not shown). The readout mechanism may include a number of counters corresponding to the number of channels in the memory bank, which can then be advanced to a number count corresponding to the number of pulses stored in their respective memory bank channels. The counters will then indicate the relative proportions of ions of masses corresponding to the various times of flight indicated by the different counters.

The readout apparatus may also include a pen and ink recorder, an oscilloscope, and other types of well-known readout devices.

As indicated above, the delay apparatus, coincidence circuit, storage and readout apparatus are not critical to the present invention so that they need not be more fully described. In fact, this type of apparatus is well known in other functions both in science and industry.

One of the problems met with in use of the coincidence mass spectrometer so far described is that noise increases with counting rate, yet if the spectrometer is to be used to detect the presence and relative amounts of trace elements in a sample, the counting rate must be relatively high. Such counting rate of course can be increased only by increasing the ionization rate which in turn is achieved by increasing the number of ionizing particles or photons emanating per second from the source of ionizing radiation, or by increasing the pressure of the gas sample in the envelope.

As was indicated in the Rosenstock patent, the coincidence mass spectrometer may be employed to detect negative ions which are not electrons, as well as secondary electrons as one element of each ionized ion pair. For that reason the detector 20 is indicated as a "negative ion" detector, rather than a "secondary electron" detector. In fact, it will be apparent that the term "negative ion" as used herein and in the claims is intended to include a secondary electron.

As an illustration of the counting rate which may be used profitably in application of the present invention to the detection of trace elements, the electron source may be set to deliver electrons at a rate sufficiently high as to cause $10^5$ or more ions per second to be formed. Unfortunately, as indicated earlier, with an embodiment of the Rosenstock patent not using the improvement of the present invention, the signal-to-noise ratio decreases with increasing ionization rate, after a certain relatively low rate is exceeded. This of course means that the noise level is increasing faster than the signal level, with such an embodiment. This noise is due to several factors, and includes a relatively signal-independent factor due to such things as cosmic rays striking the detectors. This factor is of course fairly small and is of very little significance except at very low ionization rates.

In addition to this signal-independent factor, however, there are other factors which are dependent upon counting rate and which include noises due to detection of secondary electrons from ionizations occurring outside of the volume or region of interest and from metal surfaces struck by the primary beam, as well as from missed electrons and missed positive ions at the respective detectors. With respect to the latter factor, it will be appreciated that not all of the positive ions corresponding to electrons which are detected by the electron detector 20 actually reach and are detected by the ion detector 18. The reverse is also true, since not all electrons corresponding to positive ions detected by the detector 18 reach and are detected by the electron detector 20. In fact, it is not unusual that as many as half of the ions be missed by the respective detectors. These missed electron and missed positive ion effects give rise to what might be termed "previous ion" noise and "previous electron" noise. The first type of noise is caused by the detection of a positive ion from an ionization event whose secondary electron was not detected and which occurred earlier than the event whose secondary electron was detected. It will be appreciated that detection of any positive ion would terminate the measuring time interval initiated by the electron from the later ionization event. (Because of the extremely short travel time of electrons to the detector 20, and the relatively much longer travel times of positive ions to detector 18, it is quite likely that a previously charged ion will reach the detector 18 after detection of an electron from a later ionization event, particularly at relatively high ionization rates.) The detection of such a "previous ion" will furnish an erroneous indication of a coincidence, because only the detection of coincidence of the elements of an ion-pair is correct so such indication is noise. Noise events of this type of course are randomly located in time with respect to the time of a coincidence of the true ion pair. In fact such a noise coincidence can occur at any time between the detection of the secondary electron and the time at which the positive ion corresponding thereto reaches the positive ion detector.

The second type of noise resultant from missed particles, "previous electron" noise, is caused by the failure to detect a positive ion from an ionization event which released a secondary electron which was detected, and subsequent detection of a positive ion from a later event. In such case the timing interval initiated by the detection of the electron is not terminated at the proper time, but rather is terminated at some random time after the time at which the positive ion corresponding to the detected electron should have been detected. The coincidence thereby indicated is therefore noise.

A further factor of particular significance with samples which ionize to form positive ions of different mass number is what may be called the "cross-over" effect. This effect is due to the difference in speeds between positive ions of different masses. For instance, if an ionized particle of relatively heavy mass is charged or formed at one instant and the secondary electron resultant from what event is detected, but an ionized particle of lighter mass is formed soon thereafter, the increased speed of the lighter positive ion can result in the ion passing the earlier-formed heavier ion.

Thus the lighter ion "crosses over" the heavier ion in passage down the drift tube to the ion detector 18, and results in erroneous detection of a coincidence, which is noise. Noise detections of this type of course randomly occur at any point in time between accurate time coincidence of any two different mass number ions.

The present invention is designed to prevent these various noise pulses from being detected. Those noise pulses resultant from ionization events which occur after an event which results in detection of a secondary electron are prevented by gating off, repelling, or deflecting the ionizing beam when a secondary electron is detected, and keeping it off until the corresponding positive ion is detected. This is accomplished in the illustrated apparatus of the present invention through employment of a pair of deflection plates 100 and 101 which are shown schematically as located between the electron gun 11 and the focussing grid 15. Normally no voltage is supplied between the plates 100 and 101, with the result that the ionizing beam from the electron gun passes through the focussing grid 15 into the volume V. However, when an electron is detected by the secondary electron detector 20, the pulse output of trigger 26 is delivered to the set input of a conventional type of high speed bistable flip-flop 103. The pulse triggers the flip-flop to cause it to act as a switch to close a connection between the deflection plate 101 and an ionizing beam deflector or gate supply 104. The other terminal of the supply 104 is connected to the plate 100, so that the voltage developed by supply 104 is then connected across the plates 100 and 101.

The deflector or gate supply 104 is of any appropriate type suitable to develop a direct current voltage of amplitude sufficient when connected across the deflector plates to deflect the electron beam from gun 11 away from the slot through focussing grid 15, so that the ionizing electron beam cannot reach the volume V. There may also be supplied a suitable electron trap (not shown) to collect the deflected electrons from the gun 11 so that neither electrons directly from the gun 11, nor secondary electrons from ionization events occurring in other regions than the volume V may reach the electron detector 20.

Alternatively, to the deflector-type gate, a repeller gate may be employed. That is, a repeller grid suitably biased negatively when the gate is to be turned off may be located between the electron gun or the volume V so as to repel electrons and prevent them from reaching that volume.

With the ionizing beam deflected (or the gate formed by the deflector plates and its supply closed), no ionization event can take place in the volume V and no positive ions are accelerated from that volume down the drift tube 22, with the exception of the positive ion corresponding to the secondary electron which was detected by the detector 20.

When the positive ion corresponding to this ionization event is detected by detector 18, a pulse is delivered by trigger circuit 32 through a buffer OR circuit 105 to the reset input of the bistable flip-flop 103. The flip-flop is then reset to its normal condition such that the deflector plate 101 is disconnected from the deflector supply 104, and there is no longer any voltage across the plates 100 and 101. At this time of course the gate is open and the ionizing beam is directed back into the volume 4 to cause further ionization events.

It will be realized that the interval between detection of the secondary electron and the detection of the positive ion is quite small and in fact will be of the order of microseconds in length. However, there are now available on the market high speed transistor switches of the bistable flip-flop type which are capable of operating gates in time periods of the order of nanoseconds ($10^{-9}$). Consequently, this gating scheme for the ionizing beam is extremely effective in preventing generation of noise resultant from ionization events occurring after that event which causes detection of a secondary electron.

As indicated above, the efficiency of ion detection is not perfect and in fact it may be considerably less than 100%. Consequently, it is possible that the positive ion corresponding to the secondary electron which triggered the gate closed would not be detected and it would be desired to open the gate again to permit later ionizations. This function is achieved in the apparatus illustrated through an automatic reset of the bistable flip-flop a predetermined time after it is set by detection of a secondary electron. For this purpose, the output of trigger 26 is also supplied to a variable delay circuit 106 which is effective to delay the trigger pulse by a time period greater than the time it would take the positive ion to reach the ion detector 18. This time period will ordinarily be greater than the difference in transit times of the secondary electron and positive ion for each different atomic mass of interest, from the volume V to the respective detectors. (Since the secondary electron detector 20 is located adjacent the volume V, the transit time of electrons from that region to the detector may be neglected in comparison with the transit time of positive ions to the detector 18.)

In order that the apparatus may be usable with samples of different composition, the delay device 106 is preferably adjustable under the control of the operator to furnish any desirable preselected delay period. The output of the delay circuit is directed through the buffer circuit 105 to the reset input of the flip-flop 103. Thereby, the gate formed by the deflector plates and their supply is turned on a preselected time interval after it is first turned off, even if the positive ion corresponding to the secondary electron which turned the gate off is not detected.

There still remains the desirability of preventing ionization events which occurred earlier than the event resulting in a secondary electron detected by the detector 20, from furnishing a noise response. This function is achieved through a second gate which is normally closed and which prevents positive ions formed in the volume V from getting into the drift tube 22. In the illustrated embodiment this gate is formed by a pair of deflector plates 110 and 111 positioned at opposite sides of the entrance to the drift tube to supply an electric field extending perpendicularly to the direction of ion travel. The plate 111 is connected directly to one output terminal of a positive ion deflector supply 112, while the other output terminal of that supply is connected to another bistable flip-flop 113 of design and function similar to that of flip-flop 103. The output of flip-flop 113 is connected to the plate 110 so that the switch when closed connects the plates 110 and 111 across the output terminals of deflector supply 112 to provide deflecting voltage thereacross. This voltage is sufficient to form an electric field which deflects positive ions originating in the volume V away from a direction toward the mouth of the drift tube 22.

The gate formed by the deflecting plates 110 and 111 and the supply 112 is intended to be opened for a short time interval after each detection of a secondary electron by operation of the flip-flop 113. For this purpose, the output of trigger 26, which supplies a trigger pulse each time that an electron is detected by secondary electron detector 20, is supplied, through a variable delay circuit 115, to the set input of the flip-flop 113. The flip-flop then disconnects the positive ion deflector supply from the deflector plate 111 so that the cross field no longer exists and the positive ion corresponding to the detected secondary electron passes through the drift tube 22. (It will be appreciated that with high speed flip-flops it is possible to open this gate before the positive ion reaches the gating region, particularly because of the difference in velocities of the positive ion and the secondary electron from an ionization event.) The delay circuit 115, while not essential, may be employed to make sure that the ion deflecting gate remains off until the proper ion reaches its entrance.

Since it is desired to have this deflection gate closed again after the positive ion of interest has gotten into the drift tube 22, in order to avoid detection of positive ions not corresponding to the ionization event of interest, the output pulse from delay circuit 115 is further delayed by a variable delay circuit 116 and then supplied to the reset input of the flip-flop 113. The variable delay circuit 116 will be adjusted to a preselected time period which is likely to be of the order of a microsecond and which in any event will be not substantially larger than that due to the difference in transit times of the electron and positive ion to their respective detectors.

The various delay circuits referred to herein may each be of suitable simple and well-known design operable to deliver an appropriate trigger pulse at its output an adjustable time period after a pulse is received at its input.

While both the ionizing beam gate and the positive ion beam gate are desirably employed, the latter in particular may be employed independently of the former, particularly when a photon source, such as an X-ray source is employed as the ionization beam source. In such case, the delay circuits 115 and 116 would desirably be set to furnish as short a gating period as possible for the positive ion corresponding to a detected secondary electron to pass into drift tube 22.

It will be evident that it is desirable to reset the address scaler 27 by closing gate 36 and resetting the address counter 37, in the event that a positive ion from an ionization event which caused detection of a secondary electron is not received. For this purpose, the output of variable delay circuit 106 is also connected to the input of the address scaler 27 through the buffer 33.

In operation of the illustrative apparatus of the invention, with a sample present in the envelope 12 under reduced pressure (e.g. of the order of $10^{-6}$ mm. of Hg) when the electron gun 11 is turned on and the various other circuits of the apparatus are suitably supplied with operating voltages, if an ionization event occurs in the volume V the resultant secondary electron is directed by the field between grids 16 and 17 toward the electron detector 20, while the positive ion is directed by that field and the field between the grids 21 and 16 toward the ion detector 18. Detection of the secondary electron by detector 20 results in application of an actuating pulse to the address scaler 27 to begin counting toward the appropriate address for a pulse corresponding to the mass of the positive ion. Simultaneously, a trigger voltage from trigger circuit 26 sets the flip-flop 103 to connect the supply 104 across deflector plates 100 and 101 and gate off the ionizing beam. As a result, no further ionization events occur in the volume V for a timed interval.

During that time interval the output from trigger 26 also sets the flip-flop 113 to disconnect the positive ion deflector supply 112 from across deflector plates 110 and 111. Thereby, the ion gate is opened and the positive ion corresponding to the ionization event proceeds into the drift tube and to the ion detector 18.

The output of detector 18 results in a pulse at the input of address scaler 27 which stops the counting function in that scaler and determines the channel 38 through which a voltage pulse must be directed to the memory bank 28.

The detection of the positive ion also results in resetting of flip-flop 103 to open the ionizing beam gate and permit subsequent ionization events. By this time of course the delayed pulse at the reset input of flip-flop 113 may have operated that switch to close the ion gate and prevent positive ions from reaching drift tube 22.

The input from the positive ion detector to the address scaler 27 may also reset the address counter so that it is ready again to begin counting toward the appropriate address for the next ion.

It will be evident that the plates of the pair of deflecting plates 100 and 101 and the plates of the pair of deflecting plates 110 and 111 may be connected together when the gates are open, by the associated flip-flop switches so that there is no potential difference therebetween.

It will also be evident that many minor changes could be made in the apparatus of the invention. In fact, the various elements of the apparatus of this improved coincidence mass spectrometer are each in themselves of known and conventional type. All that is necessary to the present invention is that there be an effective gate for one, and preferably both, of the ionizing beam and the positive ions resultant therefrom, that the gate for the ionizing beam be turned off between detections of secondary electrons and positive ions corresponding thereto, and that the gate for the positive ions be normally off but turned on each time that a secondary electron is detected, in order that the corresponding positive ion may be directed toward the ion detector.

Accordingly, the invention is not to be considered limited to the methods or apparatus disclosed hereinabove, but rather only by the scope of the appended claims.

I claim:

1. The method of investigating an ionization process which comprises
    directing an ionizing beam upon a predetermined volume of a sample to ionize molecules thereof to form ion-pairs composed of positive and negative ions,
    subjecting the ion-pairs to an electric field to urge the positive and negative ions thereof in different directions toward respective positive and negative ion detectors,
    separately detecting the positive and negative ions of each ion-pair received from the said volume in accordance with the difference in transit times thereof between the said volume and the ion detectors,
    and allowing positive ions to reach the positive ion detector only during a short time interval following detection of each negative ion, such time interval being not substantially longer than such difference in transit times.

2. The method of claim 1 in which said allowing step is accomplished by disabling a device for deflecting ions in a certain region between the said volume and the positive ion detector away from a path therebetween.

3. The method of claim 2 in which said time interval is just large enough to permit the positive ion corresponding to the detected negative ion to pass said certain region.

4. The method of claim 1 further including the step of inhibiting formation of ions in said volume after each detection of a negative ion for a time period sufficient to permit detection of the positive ion corresponding to said negative ion.

5. The method of claim 4 in which said ionizing beam is of charged patricles and said inhibiting step is performed by deflecting said ionizing beam away from said predetermined volume.

6. The method of investigating an ionization process which comprises
    directing an ionizing beam upon a predetermined volume of a sample to ionize molecules thereof to form ion-pairs composed of positive and negative ions,
    subjecting the ion-pairs to an electric field to urge the positive and negative ions thereof in different directions toward respective positive and negative ion detectors,
    separately detecting the positive and negative ions of each ion-pair received from the said volume,
    allowing positive ions to reach the positive ion detector only during a short time interval no greater than the transit time of positive ions to the detector following detection of each negative ion,
    initiating a measuring time interval upon each detection of a negative ion and terminating said interval when the next positive ion is detected,
    and recording said time interval as an indication of the relative mass of said positive ion.

7. The method of claim 6 including the step of forming an indication of the number of each different time interval recorded during a measuring period, as an indication of the relative proportions of different mass ions formed from said sample.

8. The method of claim 7 in which said allowing step is accomplished by disabling a device for deflecting ions from a certain region between the said volume and the positive ion detector away from a path therebetween except for a time interval large enough to permit the positive ion corresponding to the detected negative ion to pass said region.

9. The method of claim 7 further including the step of inhibiting formation of ions in said volume after each detection of a negative ion, for a time period sufficient to permit detection of the positive ion corresponding to said negative ion.

10. The method of claim 9 in which said ionizing beam is of charged particles and said inhibiting step is performed by deflecting the ionizing beam away from said predetermined volume.

11. The method of investigating an ionizing process which comprises directing an ionizing beam upon a predetermined volume of a sample to ionize molecules thereof to form ion-pairs composed of secondary electrons and positive ions, subjecting the ion-pairs to an electric field to urge the positive ions and secondary electrons thereof in opposite directions toward respective positive and negative ion detectors, separately detecting the positive ions and secondary electrons of each ion-pair received from the said volume, allowing positive ions to reach the positive ion detector only during a short time interval no greater than the transit time of positive ions to the detector following detection of each secondary electron, initiating a measuring time interval upon each detection of a secondary electron and terminating said interval when the next positive ion is detected, and recording said time interval as an indication of the relative masses of said positive and negative ions.

12. The method of claim 11 further including the step of inhibiting formation of ions in said volume after each detection of a secondary electron for a time period sufficient to permit detection of the positive ion corresponding to said secondary electron.

13. Apparatus for investigating the ionization of a sample which comprises an ionizing beam source operable to direct its beam upon said sample, means forming an electric field adjacent the region of ionization for urging the positive and negative ions of each ion-pair formed by the ionizing beam in different directions away from said region, means including separate positive and negative ion detectors spaced apart in said different directions from said region, said means being operable to furnish a response to formation of ions of a particular mass in a volume from the difference in transit times of the positive and negative ions formed with molecules of that mass, between said volume and the respective detectors, and means connected to said negative ion detector for allowing positive ions to reach said positive ion detector only during a short time interval not substantially larger than said difference in transit times, after each detection of a negative ion.

14. The apparatus of claim 13 in which said allowing means includes normally actuated beam deflecting means operable when actuated to deflect ions in a certain region between said volume and the positive ion detector away frome a path therebetween, and means connected to said negative ion detector operable to de-actuate said deflecting means for a very short time period after detection of each negative ion.

15. The apparatus of claim 13 including means connected to said detectors for inhibiting said ionizing beam from ionizing said volume of the sample after each detection of a negative ion for a time period sufficient to permit detection of the positive ion corresponding to said negative ion.

16. Apparatus for investigating the ionization of a gaseous sample which comprises an envelope containing said sample under reduced pressure, an ionizing beam source operable to direct its beam through a predetermined volume of said sample in said envelope, means forming an electric field extending through said volume and operable to urge the positive ions and secondary electrons of each ion-pair formed by the ionizing beam therein in different directions away from said area, a secondary electron detector positioned closely adjacent said volume in the path of electrons urged by said electric field away from said volume, a positive ion detector positioned a relatively large distance away from said volume in the path of positive ions urged by said electric field away from said volume, a drift tube of substantial length positioned between said positive ion detector and said volume to permit positive ions which enter the tube to drift toward the ion detector, means including a voltage source and beam deflecting electrodes positioned between said volume and the entrance to said drift tube normally connected together to deflect positive ions away from the entrance to said drift tube and prevent them from reaching the positive ion detector, means connected to said secondary electron detector for disconnecting said electrodes and source for a short time period after each detection of an electron by said secondary electron detector, means for initiating a measuring time interval each time an electron is detected and terminating said interval when the next positive ion is detected, means for recording said time interval as an indication of the relative mass of said positive ion, and means for detecting the numbers of each different time interval recorded during a measuring period, to thereby furnish an indication of the relative proportions of different mass positive ions formed from said sample.

17. The apparatus of claim 16 including means connected to the positive ion and electron detectors for preventing the ionizing beam from reaching said volume after detection of an electron by said electron detector for a time period sufficient to permit detection of the positive ion corresponding to said electron.

18. The apparatus of claim 17 in which said preventing means comprises a gate operable when closed to deflect the ionizing beam away from said volume, means connected to the secondary electron detector for closing said gate each time a secondary electron is detected, and means connected to the positive ion detector for opening the gate each time a positive ion is detected.

19. The apparatus of claim 18 including additional means for opening said gate a predetermined time period after each closure thereof in the event it is not earlier opened by said means connected to the secondary electron detector, said time period being greater than the difference in transit times of electrons and positive ions of said volume to their respective detectors, for all masses of interest.

20. The apparatus of claim 19 in which said first-mentioned means connected to said electron detector is operable to disconnect said electrodes and source for a period only long enough to permit positive ions corresponding to the detected electron to reach said drift tube.

21. The method of investigating an ionization process which comprises
- directing an ionizing beam upon a predetermined volume of a sample to ionize molecules thereof to form ion-pairs composed of positive and negative ions,
- subjecting the ion-pairs to an electric field to urge the positive and negative ions thereof in different directions toward respective positive and negative detectors,
- separately detecting the positive and negative ions of each ion-pair received from the said volume in accordance with the difference in transit times thereof between the said volume and the ion detectors,
- and inhibiting formation of ions in said volume after each detection of a negative ion for a time period sufficient to permit detection of the positive ion corresponding to said negative ion.

22. The method of investigating an ionization process which comprises
- directing an ionizing beam upon a predetermined volume of a sample to ionize molecules thereof to form ion-pairs composed of positive and negative ions,
- subjecting the ion-pairs to an electric field to urge the positive and negative ions thereof in different directions toward respective positive and negative ion detectors,
- separately detecting the positive and negative ions of each ion-pair received from the said volume,
- inhibiting formation of ions in said volume after each detection of a negative ion for a time period sufficient to permit detection of the positive ion corresponding to said negative ion,
- initiating a measuring time interval upon each detection of a negative ion and terminating said interval when the next positive ion is detected,
- recording said time interval as an indication of the relative mass of said positive ion,
- and forming an indication of the number of each different time interval recorded during a measuring period, as an indication of the relative proportions of different mass ions formed from said sample.

23. The method of investigating an ionizing process which comprises
- directing an ionizing beam upon a predetermined volume of a sample to ionize molecules thereof to form ion-pairs composed of secondary electrons and positive ions,
- subjecting the ion-pairs to an electric field to urge the positive ions and secondary electrons thereof in opposite directions toward respective positive and negative ion detectors,
- separately detecting the positive ions and secondary electrons of each ion-pair received from the said volume,
- inhibiting formation of ions in said volume after each detection of a secondary electron for a time period sufficient to permit detection of the positive ion corresponding to said secondary electron,
- initiating a measuring time interval upon each detection of a secondary electron and terminating said interval when the next positive ion is detected,
- and recording said time interval as an indication of the relative masses of said positive and negative ions.

24. Apparatus for investigating the ionization of a sample which comprises
- an ionizing beam source operable to direct its beam upon said sample,
- means forming an electric field adjacent the region of ionization for urging the positive and negative ions of each ion-pair formed by the ionizing beam in different directions away from said region,
- means including separate positive and negative ion detectors spaced apart in said different directions from said region, said means being operable to furnish a response to formation of ions of a particular mass in a volume from the difference in transit times of the positive and negative ions formed with molecules of that mass, between said volume and the respective detectors,
- and means connected to said detectors for inhibiting said ionizing beam from ionizing said volume of the sample after each detection of a negative ion for a time period sufficient to permit detection of the positive ion corresponding to said negative ion.

25. Apparatus for investigating the ionization of a gaseous sample which comprises
- an envelope containing said sample under reduced pressure,
- an ionizing beam source operable to direct its beam through a predetermined volume of said sample in said envelope,
- means forming an electric field extending through said volume and operable to urge the positive ions and secondary electrons of each ion-pair formed by the ionizing beam therein in different directions away from said area,
- a secondary electron detector positioned closely adjacent said volume in the path of electrons urged by said electric field away from said volume,
- a positive ion detector positioned a relatively large distance away from said volume in the path of positive ions urged by said electric field away from said volume,
- a drift tube of substantial length positioned between said positive ion detector and said volume to permit positive ions which enter the tube to drift toward the ion detector,
- means connected to the positive ion and electron detectors for preventing the ionizing beam from reaching said volume after detection of an electron by said electron detector for a time period sufficient to permit detection of the positive ion corresponding to said electron,
- means for initiating a measuring time interval each time an electron is detected and terminating said interval when the next positive ion is detected,
- means for recording said time interval as an indication of the relative mass of said positive ion,
- and means for detecting the numbers of each different time interval recorded during a measuring period to thereby furnish an indication of the relative proportions of different mass positive ions formed from said sample.

26. The apparatus of claim 25 in which said preventing means comprises a gate operable when closed to deflect the ionizing beam away from said volume,
- means connected to the secondary electron detector for closing said gate each time a secondary electron is detected,
- and means connected to the positive ion detector for opening the gate each time a positive ion is detected.

References Cited by the Examiner

UNITED STATES PATENTS

| | | | |
|---|---|---|---|
| 2,764,691 | 9/1956 | Hipple | 250—41.9 |
| 2,780,728 | 2/1957 | Langmuir | 250—41.9 |
| 2,798,162 | 7/1957 | Hendee | 250—41.9 |
| 2,999,157 | 9/1961 | Rosenstock | 250—41.9 |

RALPH G. NILSON, *Primary Examiner.*

W. F. LINDQUIST, *Assistant Examiner.*